(12) United States Patent
Huang

(10) Patent No.: US 10,640,637 B2
(45) Date of Patent: May 5, 2020

(54) SUBSTRATE COMPOSITION AND SUBSTRATE PREPARED THEREFROM

(71) Applicant: INDUSTRIAL TECHNOLOGY RESEARCH INSTITUTE, Hsinchu (TW)

(72) Inventor: Shi-Ing Huang, Zhunan Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 17 days.

(21) Appl. No.: 16/116,706

(22) Filed: Aug. 29, 2018

(65) Prior Publication Data
US 2019/0177527 A1 Jun. 13, 2019

(30) Foreign Application Priority Data

Dec. 13, 2017 (TW) .............................. 106143708 A
Jun. 21, 2018 (TW) .............................. 107121300 A

(51) Int. Cl.
| | | |
|---|---|---|
| C08L 27/18 | (2006.01) | |
| C08K 5/3492 | (2006.01) | |
| C08K 3/36 | (2006.01) | |
| C09D 127/18 | (2006.01) | |
| C08K 5/549 | (2006.01) | |
| C08L 83/04 | (2006.01) | |
| C08G 77/20 | (2006.01) | |
| C08K 5/14 | (2006.01) | |

(52) U.S. Cl.
CPC ............ C08L 27/18 (2013.01); C08K 3/36 (2013.01); C08K 5/34924 (2013.01); C08K 5/549 (2013.01); C09D 127/18 (2013.01); C08G 77/20 (2013.01); C08K 5/14 (2013.01); C08L 83/04 (2013.01); C08L 2203/16 (2013.01); C08L 2203/20 (2013.01); C08L 2205/02 (2013.01)

(58) Field of Classification Search
None
See application file for complete search history.

(56) References Cited

U.S. PATENT DOCUMENTS

| | | | |
|---|---|---|---|
| 5,696,189 A | 12/1997 | Legare | |
| 6,890,995 B2 | 5/2005 | Kolb et al. | |
| 7,364,672 B2 | 4/2008 | Koes et al. | |
| 7,989,552 B2 | 8/2011 | Grootaert et al. | |
| 8,269,115 B2 | 9/2012 | Su | |
| 8,551,628 B2 | 10/2013 | Su | |
| 8,883,316 B2 | 11/2014 | Su | |
| 9,441,101 B2 | 9/2016 | Yokota | |
| 2009/0082519 A1 | 3/2009 | Irie et al. | |
| 2010/0021687 A1 | 1/2010 | Su | |
| 2010/0258340 A1 | 10/2010 | Su | |
| 2011/0045304 A1 | 2/2011 | Su | |
| 2013/0180770 A1 | 7/2013 | Su | |
| 2014/0163153 A1 | 6/2014 | Yokota | |
| 2016/0362527 A1 | 12/2016 | Koes | |
| 2019/0136109 A1* | 5/2019 | Agapov | ................ H01L 23/145 |
| 2019/0169415 A1* | 6/2019 | Matsumoto | ............. C08L 27/18 |

FOREIGN PATENT DOCUMENTS

| | | |
|---|---|---|
| CN | 102239214 A | 11/2011 |
| CN | 106867173 A | 6/2017 |
| TW | 201538532 A | 10/2015 |
| TW | 201629125 A | 8/2016 |

OTHER PUBLICATIONS

John Coonrod, "Selecting PCB Materials for High-Frequency Applications", Microwave Engineering Europe, Mar.-Apr. 2012, Total of 5 pages.
Tian Yong et al., "Phase Behavior, Cure Behavior, and Morphology of Poly(Phenylene Ether)/Triallylisocyanurate Blends", Journal of Southwest China Normal University (Natural Science), vol. 30, No. 5, Oct. 2005, pp. 856-861.
Zhaokang Hu et al., "Photochemically Cross-Linked Perfluoropolyether-Based Elastomers: Synthesis, Physical Characterization, and Biofouling Evaluation", Macromolecules 2009, vol. 42, No. 18, pp. 6999-7007.
Taiwanese Office Action for Appl. No. 107121300 dated Oct. 22, 2019.

* cited by examiner

Primary Examiner — Robert T Butcher
(74) Attorney, Agent, or Firm — Birch, Stewart, Kolasch & Birch, LLP

(57) ABSTRACT

A substrate composition and a substrate prepared from the substrate composition are provided. The substrate composition includes 25-80 parts by weight of a polymer, 20-75 parts by weight of an inorganic filler, and 0.015-0.7 parts by weight of a compound. The total weight of the polymer and the inorganic filler are 100 parts by weight. The polymer is selected from a group consisting of polytetrafluoroethylene (PTFE) and perfluoroalkoxy alkane (PFA). The compound has at least three terminal vinyl groups.

8 Claims, 2 Drawing Sheets

SUBSTRATE COMPOSITION AND SUBSTRATE PREPARED THEREFROM

CROSS-REFERENCE TO RELATED APPLICATION

This application claims the priority benefit of Taiwan application no. 106143708, filed on Dec. 13, 2017 and Taiwan application no. 107121300 filed on Jun. 21, 2018. The entirety of each of the above-mentioned patent applications is hereby incorporated by reference herein and made a part of this specification

TECHNICAL FIELD

The disclosure relates to a substrate composition and a substrate prepared from the same.

BACKGROUND

In addition to being light, thin, short, and small, electronic products in the new century are trending toward using high-frequency transmission, so that the wiring of printed circuit boards must be increasingly dense to increase the transmission speed and maintain signal integrity at the same time. Electronic products adopt multilayered semiconductor devices and precise packaging technology, and use advanced bonding and mounting technologies to achieve a high density of multilayered circuit boards.

In the field of electronic components, there has been an urgent need for high-frequency communication equipment, and accordingly, related electronic component materials have recently been required, such as semiconductor sealing materials having a low dielectric constant and materials having a low dielectric loss factor, so that data can be transmitted quickly without data loss or interference during the transmission process.

Polytetrafluoroethylene (PTFE) has been commonly used as a high-frequency substrate material because of its low dielectric constant and dielectric loss factor. However, the material itself, polytetrafluoroethylene (PTFE), is insufficient in rigidity, and it is not easy to use it in subsequent processing, and the mechanical strength of the obtained substrate is also poor.

Therefore, the development of a substrate material having a low dielectric constant, a low loss factor, good heat resistance, and high mechanical strength is an important topic in the relevant art at this stage.

SUMMARY

The disclosure provides a substrate composition including 25-80 parts by weight of a polymer, wherein the polymer is selected from a group consisting of polytetrafluoroethylene (PTFE) and perfluoroalkoxy alkane (PFA); 20-75 parts by weight of an inorganic filler, wherein the total weight of the polymer and the inorganic filler are 100 parts by weight; and 0.015-0.7 parts by weight of a compound. The compound has at least three terminal vinyl groups.

The disclosure further provides a substrate including a film layer, wherein the film layer is a cured product formed from the substrate composition.

Several exemplary embodiments accompanied with figures are described in detail below to further describe the disclosure in details.

BRIEF DESCRIPTION OF THE DRAWINGS

The accompanying drawings are included to provide a further understanding of the disclosure, and incorporated in and constitute a part of this specification. The drawings illustrate embodiments of the disclosure and, together with the description, serve to explain the principles of the disclosure.

DETAILED DESCRIPTION

Figure 1:
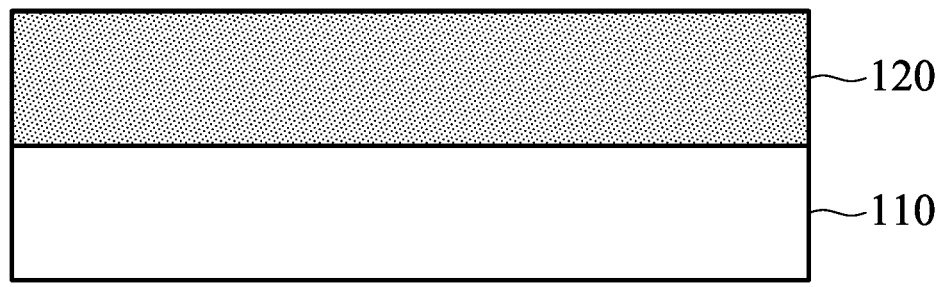
FIG. 1 is a schematic of a substrate according to an embodiment of the present disclosure.

Hereinafter, embodiments of the disclosure are described in detail. The details provided in the embodiments are exemplary, and are not intended to limit the scope of the disclosure. Those having ordinary skill in the art can modify or change the details according to the requirements of actual implementation. For instance, for clarity, the relative thickness and location of film layers, regions, and/or structural elements may be reduced or enlarged.

The present disclosure provides a substrate composition and a substrate formed from the substrate composition. The disclosed substrate composition includes a specific polymer, an inorganic filler, and a compound having at least three terminal vinyl groups. The above components constitute the substrate composition in a specific ratio. The workability of the substrate composition can be improved and the mechanical strength of the substrate prepared from the composition can be increased without affecting the dielectric properties (such as dielectric constant and loss factor), due to the addition of a compound with at least three terminal vinyl groups.

According to the embodiment of the present disclosure, a substrate composition includes 25-80 parts (such as 30-75 parts or 35-70 parts) by weight of polymer; 20-75 parts (such as 25-70 parts or 30-65 parts) by weight of inorganic filler, wherein the total weight of the polymer and the inorganic filler are 100 parts by weight; and 0.015-0.7 parts by weight of the compound, wherein the compound has at least three terminal vinyl groups.

According to the embodiment of the present disclosure, the polymer is selected from the group consisting of polytetrafluoroethylene (PTFE) and perfluoroalkoxy alkane (PFA). In addition, the number average molecular weight of the polymer can be from hundreds of thousands to millions.

According to the embodiment of the present disclosure, the inorganic filler includes for example $SiO_2$, $Al_2O_3$, MgO, $CaCO_3$, SiC, $Na_2CO_3$, $TiO_2$, ZnO, ZrO, graphite, $MgCO_3$, $BaSO_4$, or a combination thereof. The inorganic filler may have an average particle size of about 500 nm to 3000 nm.

In accordance with the embodiment of the present disclosure, the properties of the substrate composition (and the substrate formed from the substrate composition) are greatly influenced by how much of the compound with at least three terminal vinyl groups is added. According to the embodiment of the present disclosure, the amount of the compound with at least three terminal vinyl groups, that is added, is maintained within a range of 0.015-0.7 parts by weight (for example, 0.018-0.65 parts by weight, 0.018-0.6 parts by weight, or 0.015-0.6 parts by weight). The workability of the substrate composition and the mechanical strength of the formed substrate cannot be improved if the amount of the compound with at least three terminal vinyl groups added is too low or too high. In addition, the dielectric constant and loss factor of the substrate composition tend to increase if the amount of the compound with at least three terminal vinyl groups, that is added, exceeds 0.7 parts by weight.

According to the embodiment of the present disclosure, the compound having at least three terminal vinyl groups includes triallylisocyanurate (TAIC), trimethallyl isocyanurate (TMAIC), triallylcyanurate (TAC), tetravinyltetramethylcyclotetrasiloxane, octavinyloctasilsesquioxane, or a combination thereof. In addition, according to the embodiment of the present disclosure, the compound having at least three terminal vinyl groups is selected from the group consisting of triallylisocyanurate (TAIC), trimethallyl isocyanurate (TMAIC), triallylcyanurate (TAC), tetravinyltetramethylcyclotetrasiloxane, and octavinyloctasilsesquioxane.

According to the embodiment of the present disclosure, the substrate composition may further include 0.01-10 parts by weight of additive, wherein the additive includes initiator, flat agent, colorant, defoamer, flame retardant, or a combination thereof.

According to the embodiment of the present disclosure, the substrate composition may further include a solvent to uniformly disperse the polymers, inorganic fillers, compounds, and/or additives in the solvent. The solvent includes, for example, methyl ethyl ketone, propylene glycol methyl acetate (PGMEA), ethyl-2-ethoxyethanol acetate, ethyl 3-ethoxypropionate, isoamyl acetate, benzene, toluene, xylene, Cyclohexane, or a combination thereof.

According to the embodiment of the present disclosure, the initiator includes a peroxide initiator such as benzoyl peroxide, 1,1-bis(tert-butylperoxy)cyclohexane, (2,5-bis(tert-butylperoxy)-2,5-dimethylcyclohexane), 2,5-bis(tert-butylperoxy)-2,5-dimethyl-3-cyclohexyne, bis(1-(tert-butylperoxy)-1-methy-ethyl)benzene, tert-butyl hydroperoxide, tert-butyl peroxide, tert-butyl peroxybenzoate, cumene hydroperoxide, cyclohexanone peroxide, dicumyl peroxide, lauroyl peroxide, or a combination thereof.

According to the embodiment of the present disclosure, the disclosure also provides a substrate including a film layer, wherein the film layer is a cured product formed from the substrate composition. According to the embodiment of the present disclosure, the preparation method of the substrate includes the following steps: drying the substrate composition at 80° C. to 120° C. (removal of solvent), forming a sheet in a roller press process. Next, the sheet is dried at 150° C. to 300° C. to obtain the film layer.

Referring to FIG. 1, according to the present disclosure, the substrate 100 may further include a first metal foil 120 disposed on the film layer 110. According to the present disclosure, the first metal foil includes a copper foil or an aluminum foil.

Figure 2:
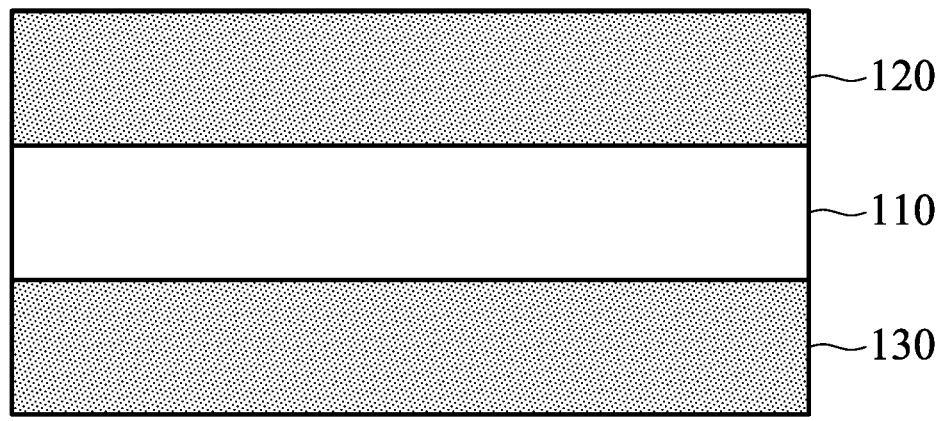
FIG. 2 is a schematic of a substrate according to another embodiment of the present disclosure.

Referring to FIG. 2, according to the present disclosure, in addition to the first metal foil 120 and the film layer 110, the substrate 100 may further include a second metal foil 130. In particular, the film layer 110 is disposed between the first metal foil 120 and the second metal foil 130. According to the present disclosure, the second metal foil may be a copper foil or an aluminum foil.

According to the embodiment of the present disclosure, the substrate has a low dielectric constant, a low loss factor, and a high mechanical strength, and can be used as a printed circuit board, an integrated circuit carrier board, or a high-frequency substrate.

In order that the above and other objects, features, and advantages of the present disclosure may be more clearly understood, the following describes several embodiments and comparative examples in detail as follows:

Substrate Composition

Example 1

4 g of trimethallyl isocyanurate (TMAIC) (available from Hunan Farida Technology Co., Ltd.) and 1.2 g of dicumyl peroxide were dissolved in 36 g of methyl ethyl ketone to obtain a solution containing trimethylallyl isocyanurate (TMAIC solution). Next, 27.5 g of silicon dioxide (average particle size 25 nm, available from US Silica) and 37.5 g of PTFE dispersion solution (purchased from DuPont with a PTFE content of 60% (22.5 g)) were added), and 0.1 g of the above-mentioned solution containing trimethylallyl isocyanurate (in which the trimethylallyl isocyanurate content was 0.0097 g) was mixed. After drying to remove a portion of the solvent, a substrate composition (1) was obtained.

Example 2

According to the preparation method of the substrate composition (1) described in Example 1, except that the trimethylallyl isocyanurate-containing solution was increased from 0.1 g to 0.25 g, a substrate composition (2) was obtained.

Example 3

According to the preparation method of the substrate composition (1) described in Example 1, except that the trimethylallyl isocyanurate-containing solution was increased from 0.1 g to 0.5 g, a substrate composition (3) was obtained.

Example 4

According to the preparation method of the substrate composition (1) described in Example 1, except that the trimethylallyl isocyanurate-containing solution was increased from 0.1 g to 1 g, a substrate composition (4) was obtained.

Example 5

According to the preparation method of the substrate composition (1) described in Example 1, except that the trimethylallyl isocyanurate-containing solution was increased from 0.1 g to 3 g, a substrate composition (5) was obtained.

Comparative Example 1

According to the preparation method of the substrate composition (1) described in Example 1, except that no trimethylallyl isocyanurate solution was added, a substrate composition (6) was obtained.

Comparative Example 2

According to the preparation method of the substrate composition (1) described in Example 1, except that the trimethylallyl isocyanurate-containing solution was increased from 0.1 g to 5 g, a substrate composition (7) was obtained.

Example 6

4 g of tetravinyltetramethylcyclotetrasiloxane (purchased from Gelton Inc.) and 1.2 g of dicumyl peroxide were dissolved in 36 g of methyl ethyl ketone to obtain a solution containing tetravinyltetramethyl tetramethylcyclotetrasiloxane. Next, 27.5 g of silica oxide (average particle size 25 available from US Silica) and 37.5 g of PTFE dispersion solution (available from DuPont with a PTFE content of 60% (22.5 g) were used), and 1 g of the tetravinyltetramethylcyclotetrasiloxane solution in which the tetravinyltetramethylcyclotetrasiloxane content was 0.097 g were mixed. After drying to remove some of the solvent, substrate composition (8) was obtained.

Example 7

4 g of octavinyl octasilsesquioxane (purchased from Gelest Inc.) and 1.2 g of dischumyl peroxide were dissolved in 36 g of methyl ethyl ketone to obtain an octavinyl octasilsesquioxane-containing solution. Next, 27.5 g of silica oxide (average particle size 25 available from US Silica), 37.5 g of PTFE dispersion solution (available from DuPont with a PTFE content of 60% (22.5 g)), and 1 g of octavinyl octasilsesquioxane solution (where octavinyl octasilsesquioxane content was 0.097 g) were mixed. After drying to remove a portion of the solvent, a substrate composition (9) was obtained.

Substrate Preparation and Property Measurement

Example 8

The substrate compositions described in Examples 1-5 and Comparative Examples 1-2 were separately dried at 120° C. to remove the solvent. Next, each of the dried product was rolled using a roller to form a sheet. Next, the sheet was dried and cured at 150° C. to 300° C. to form a film layer (1)-(7) (having a thickness of about 300 μm). Finally, the obtained film layers (1) to (7) were respectively laminated with a copper foil (available from Fukuda, thickness 18 μm) to obtain substrates (1) to (7).

Next, after the copper foil was etched and removed, the dielectric coefficient (Dk), dielectric loss factor (Df), elastic modulus, viscosity modulus, and complex modulus of the film layers (1)-(7) were measured. The results are shown in Table 1. The dielectric coefficient (Dk) and dielectric loss factor (Df) were measured at a frequency of 10 GHz using a microwave dielectrometer (available from AET Corporation); The elastic modulus, the viscosity modulus, and the complex modulus were measured at 50° C. using a viscosity analyzer and were performed in accordance with ASTM D 5992-96.

TABLE 1

| | SiO$_2$(g)/ PTFE (g) | trimethallyl isocyanurate solution (g) | trimethallyl isocyanurate (g) | Dk | Df | elastic modulus (MPa) | viscosity modulus (MPa) | complex modulus (MPa) |
|---|---|---|---|---|---|---|---|---|
| film layer(1) | 27.5/22.5 | 0.1 | 0.0097 | 3.04 | 0.0016 | 2176 | 176.8 | 2183.2 |
| film layer(2) | 27.5/22.5 | 0.25 | 0.02425 | 2.99 | 0.0015 | 1813 | 191.6 | 1823.1 |
| film layer(3) | 27.5/22.5 | 0.5 | 0.0485 | 3.4 | 0.0017 | 1824 | 182.2 | 1833.1 |
| film layer(4) | 27.5/22.5 | 1 | 0.097 | 2.99 | 0.0013 | 2232 | 191.9 | 2240.2 |
| film layer(5) | 27.5/22.5 | 3 | 0.291 | 3.15 | 0.0017 | 2290 | 256 | 2304.3 |
| film layer(6) (Comparative Example 1) | 27.5/22.5 | 0 | 0 | 3.12 | 0.0012 | 1340 | 117.2 | 1345.1 |
| film layer(7) (Comparative Example 2) | 27.5/22.5 | 5 | 0.485 | 3.03 | 0.0015 | 1064 | 111.9 | 1069.9 |

Example 9

The substrate composition described in Examples 6 was dried at 120° C. to remove the solvent. Next, the dried product was rolled using a roller to form a sheet. Next, the sheet was dried and cured at 150° C. to 300° C. to form a film layer (8) (having a thickness of about 300 μm). Finally, the obtained film layers (8) was laminated with a copper foil (available from Fukuda, thickness 18 μm) to obtain substrates (8). After the copper foil was etched and removed, the dielectric coefficient (Dk), dielectric loss factor (Df), elastic modulus, viscosity modulus, and complex modulus of the film layers (8) was measured. The results are shown in Table 2.

TABLE 2

| | SiO$_2$(g)/ PTFE (g) | tetravinyltetramethyl-cyclotetrasiloxane solution (g) | tetravinyltetramethyl-cyclotetrasiloxane (g) | Dk | Df | elastic modulus (MPa) | viscosity modulus (MPa) | complex modulus (MPa) |
|---|---|---|---|---|---|---|---|---|
| film layer(6) (Comparative Example 1) | 27.5/22.5 | 0 | 0 | 3.12 | 0.0012 | 1340 | 117.2 | 1345.1 |
| film layer(8) | 27.5/22.5 | 1 | 0.097 | 2.97 | 0.0015 | 2179 | 148.6 | 2184.1 |

As shown in Table 1-2, the substrate composition described in Examples 1-6 adds about 0.0194 parts by weight to 0.582 parts by weight of at least three terminal vinyl groups compounds (e.g., trimethylallyl isocyanurate (TMAIC) or tetravinyltetramethylcyclotetrasiloxane) (relative to 100 parts by weight of inorganic filler and polymer), therefore, according to the film layers formed by the substrate composition of the present disclosure, in addition to still having a low dielectric constant and a low dielectric loss factor, the elastic modulus, the viscosity modulus, and the composite modulus of the film layers of the disclosure are significantly increased as compared with the film layer (without the addition of the compound having at least three terminal vinyl groups) as disclosed in Comparative Example 1.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A substrate composition, comprising:
   25-80 parts by weight of polymer, wherein the polymer is selected from a group consisting of polytetrafluoroethylene (PTFE) and perfluoroalkoxy alkane (PFA);
   20-75 parts by weight of inorganic filler, wherein the total weight of the polymer and the inorganic filler are 100 parts by weight; and
   0.015-0.7 parts by weight of compound, wherein the compound is trimethallylisocyanurate, tetravinyltetramethylcyclotetrasiloxane, octavinyl octasilsesquioxane, or a combination thereof.

2. The substrate composition as claimed in claim 1, wherein the inorganic filler comprises $SiO_2$, $Al_2O_3$, MgO, $CaCO_3$, SiC, $Na_2CO_3$, $TiO_2$, ZnO, ZrO, graphite, $MgCO_3$, $BaSO_4$, or a combination thereof.

3. The substrate composition as claimed in claim 1, further comprising 0.01-10 parts by weight of additive.

4. The substrate composition as claimed in claim 3, wherein the additive
   comprises flat agent, colorant, defoamer, flame retardant, or a combination thereof.

5. A substrate, comprising:
   a film layer, wherein the film layer is a cured product formed from the substrate composition described in claim 1.

6. The substrate as claimed in claim 5, further comprising:
   a first metal foil, disposed on the film layer.

7. The substrate as claimed in claim 6, further comprising:
   a second metal foil, wherein the film layer is disposed between the first metal foil and the second metal foil.

8. The substrate as claimed in claim 5, wherein the substrate is a printed circuit board, an integrated circuit carrier board, or a high-frequency substrate.

* * * * *